Feb. 18, 1958 E. N. TISDELL 2,823,601
HAY BALER TYING NEEDLE GUIDE
Filed Jan. 11, 1956 2 Sheets-Sheet 1

INVENTOR.
Earl N. Tisdell
BY
ATTORNEY

Feb. 18, 1958   E. N. TISDELL   2,823,601
HAY BALER TYING NEEDLE GUIDE

Filed Jan. 11, 1956   2 Sheets-Sheet 2

INVENTOR.
Earl N. Tisdell,
BY
Loyal J. Miller
ATTORNEY

United States Patent Office 2,823,601
Patented Feb. 18, 1958

2,823,601

HAY BALER TYING NEEDLE GUIDE

Earl N. Tisdell, Connerville, Okla.

Application January 11, 1956, Serial No. 558,453

2 Claims. (Cl. 100—19)

The present invention relates to hay balers, and more particularly to hay balers of the self-tying type in which the bales are automatically tied when a predetermined amount of hay has been compressed within the bale chamber.

Most automatic tying hay balers in use at the present time have a tying mechanism which is tripped or actuated by the movement of hay being compressed within the bale chamber. When the tying mechanism is tripped, a pair of needles enter the bale chamber dividing the hay and carrying tying-twine or wire to the mechanism, thus tying the desired amount of hay and forming a bale. The bale chamber of most hay balers is rectangular in general configuration. The side walls of these chambers are usually formed of two spaced-apart comparatively heavy sheet metal strips. Each strip having substantially a channel shape disposed edgewise and longitudinally of the chamber. The top and bottom of the bale chamber is generally defined by spaced-apart angle or strap iron strips which guide the hay while being compressed. Needle pitman brackets are usually connected to the exterior of the vertical side walls of the bale chamber. Under ideal conditions the needles properly position the wire or twine to be twisted or tied by the tying mechanism. However, many factors enter into the baling of hay which affect the operation of the baler to such an extent that the tying mechanism sometimes fails to tie one or more bales of hay.

The most frequently encountered difficulty resulting in the failure of the baler to tie a bale is the "breathing" or fluctuation of the sides of the bale chamber. The vertical walls of the bale chamber described hereinabove are intended to have sufficient inherent rigidity to withstand the pressure of the hay being compressed within the chamber and maintain the needle pitman brackets in proper position. However, many times during the course of a day's work the ram compressing the hay causes one or both sides of the chamber to bulge outwardly resulting in the needle tip, carrying the wire or twine, to miss its contact with the associated parts within the tying mechanism upon actuation of the same. The bulging or fluctuation of the chamber sides is only a slight movement, but only a fraction of an inch misplacement of the pitman bracket position results in a proportionately larger mismating within the tying mechanism.

It is therefore the principal object of this invention to provide a device for rigidly positioning the needle pitman brackets independently of any movement of the sides of the bale chamber.

Another object is to provide a device of this class which may be connected to most automatic tying hay balers.

An additional object is to provide a device of this class which may be easily attached to the bale chamber without modification of the same.

A further object is to provide a device which also may be connected to the bale tying frame, and which will therefore preclude any longitudinal movement of the device relative to the tying mechanism.

Yet another object is to provide a device of this class which is sturdily constructed, and which will therefore last as long as the baler to which it is connected.

The present invention accomplishes these and other objects by providing a clamping arrangement comprising a pair of elongated plate metal members having transversely thickened right angularly shaped end portions adapted to contactibly engage the outer opposing corner surfaces of the bale chamber, thus disposing the intermediate portion of each member in spaced-apart relation with the adjacent side wall of the chamber. The members are co-operatingly disposed vertically on opposing sides of the bale chamber and have vertical flanges extending above and below the chamber in parallel relation. Suitable bolting means extends between the flanges, thus clamping the members around the bale chamber. Suitable perforations in each member intermediate its ends receive and support the needle pitman brackets.

Other objects will be apparent from the following description when taken in conjunction with the accompanying three sheets of drawings, wherein.

Like characters of reference designate like parts in those figures of the drawings in which they occur.

In the drawings.

Figure 1:
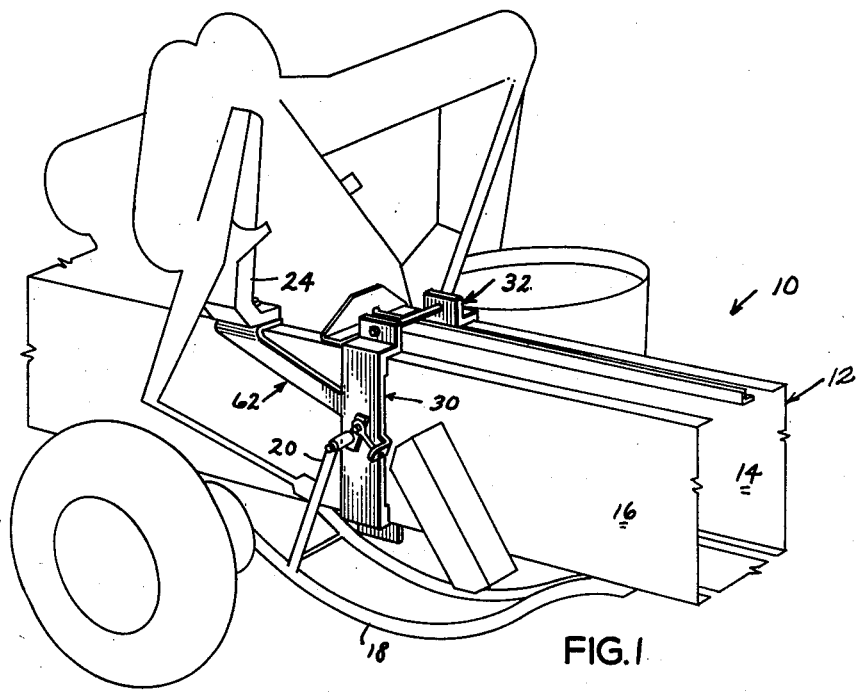
Figure 1 is a fragmentary perspective view of a baler, shown in outline, and illustrating the device installed thereon.
Figure 3:
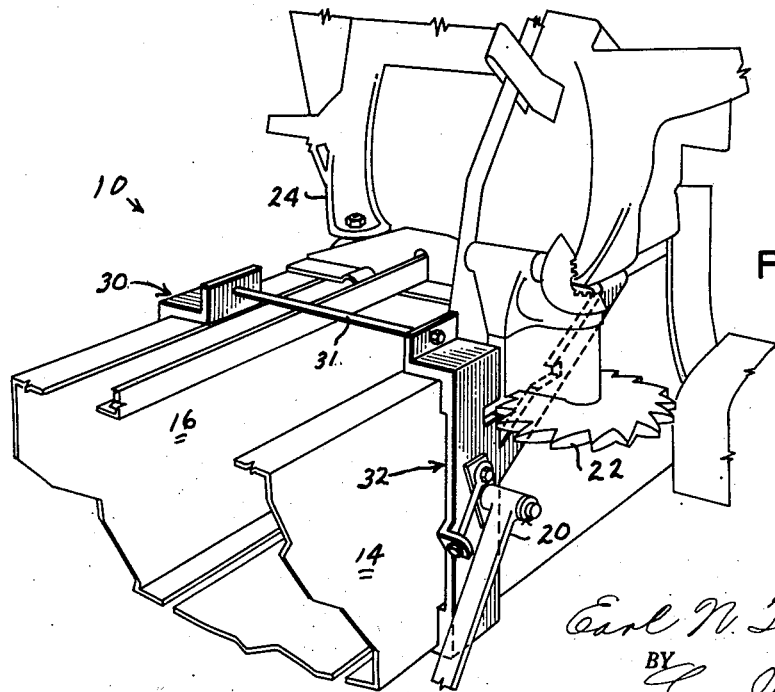
Fig. 3 is a fragmentary perspective view similar to Fig. 1 but showing the opposite side of a baler and the relationship of the device to the working parts of the baler.

Referring more particularly to Fig. 1, the reference numeral 10 indicates, as a whole, a fragment of one type of a conventional automatic tying hay baler, shown in outline, and which includes a hollow substantially rectangular bale chamber 12 within which hay is compressed. The bale chamber 12 is formed of a pair of side panels 14 and 16 vertically disposed longitudinally in spaced-apart relation. Needle guards 18 depend from and are rigidly connected to the lower surface of the panels 14 and 16, respectively. Needle pitmans and brackets 20 are normally connected to the sides of the panels at a selected location. As is shown more clearly in Fig. 3, the needle pitman 20 is positioned rearwardly of and relatively close to the metering wheel 22 and tying mechanism 24. The needle pitmans 20 carry, on their lower ends, bale tying needles, not shown. Upon actuation of the bale tying mechanism 24 by the metering wheel 22 the pitmans 20 pivot forwardly, inserting the needles into the hay to co-operate with the tying mechanism to tie the bale in a conventional manner.

The above description is conventional with several makes of automatic tying hay balers, and forms no part of the present invention.

Figure 2:
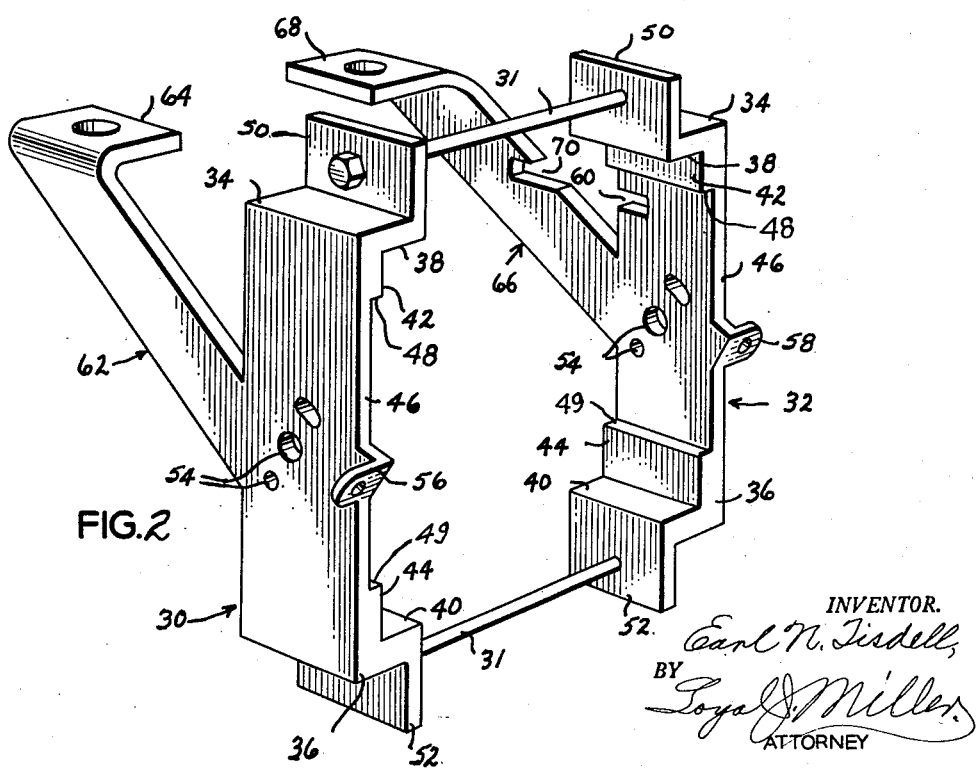
Figure 2 is a perspective view of the device, per se.

Referring to Fig. 2, it may be seen that a pair of elongated substantially U-shaped clamping members 30 and 32, preferably made of plate metal or other suitable rigid material, are rigidly joined in spaced parallel relation by bolts 31 through flanged ends. Each member has a portion of each end bent or formed to describe a right angle, as at 34 and 36. The right angular ends 34 and 36 lie on a common side of the member in co-operating relation. Thus, one horizontally disposed side 38, of the angle 34, is parallel with the co-operating horizontally disposed side 40 of the angle 36. The spacing between the angle sides 38 and 40 is substantially equal with relation to the vertical height of the side panel 16. The side of the member 30, between the angular ends 34 and 36, is recessed or cut away to form a longitudinal intermediate portion, as at 46, having substantially one-half the thickness of the angular ends 34 and 36, and is defined at its upper end by a transverse shoulder 48, and at its lower end by a similar shoulder 49. The shoulders 48 and 49 are spaced from the respective angular ends 34 and 36, respectively, a selected distance, thus forming comparatively short vertically disposed sides 42 and 44 of the angle ends 34 and 36, respectively. The sides 42 and 44 of the angular ends are vertically aligned in the same plane. The free ends of the member 30 are bent upwardly and downwardly substantially parallel with relation to the portion 46 to form an upstanding flange 50 and a depending flange 52 adjacent the respective angular shaped ends 34 and 36. The member 30 may be formed or cast as shown in Fig. 2, or formed of plate material having a thickness equal to the portion 46, and right angular sections welded into the right angular ends 34 and 36 to form the recessed portion if desired. At a selected point intermediate its ends, the member 30 is plurally perforated, as at 54, for receiving the needle pitman brackets 20. A perforated lug 56 is formed or welded to the right hand or rearward edge, as seen in Fig. 2, of the member 30 and projects outwardly therefrom adjacent the perforations 54, for the purposes more fully explained hereinbelow.

The member 32 is formed identically with relation to the member 30 except that an outstanding lug 58, similar to the lug 56, is connected to the right hand or rearward edge of the member 32, as seen in Fig. 2, thus making the member 30 a left hand part for the baler 10, and the member 32 a right hand part. This right and left hand relationship of the members 30 and 32 is clearly illustrated in Figs. 1 to 3 inclusive.

In installing the device on a baler, the pitman brackets 20 are disconnected from the sides 14 and 16 of the bale chamber and the member 30 is vertically disposed adjacent the exterior of the bale chamber side 16, with the inwardly disposed surfaces of the angular ends 34 and 36 contacting the upper and lower corner surfaces, respectively, of the side 16. The member 30 is positioned on the bale chamber side 16 so that the perforations 54 are substantially in alignment with the original perforations in the side 16 which support the bracket 20. Similarly the member 32 is similarly disposed in co-operating aligned clamping relation on the opposing side 14 of the bale chamber. The transverse width of the members 30 and 32 is such that a horizontally disposed slot 60 must be cut in the forward or leading edge opposite the lug 58 on the member 32 to accommodate the metering wheel 22. The bolts 31 then connect the flanges 50 and 52 of each said member to complete the clamping action of the device around the bale chamber. The reference to a clamping action of the bale chamber refers only to the positioning of the device by its contact with the outer surfaces of the four corners of the rectangular bale chamber. When the device is installed as disclosed, the side walls 14 and 16 are in spaced-apart relation with relation to the longitudinal intermediate portion 46 of each member 30 and 32. This allows the sides 14 and 16 to fluctuate inwardly and outwardly intermediate its upper and lower edges as hay is compressed within the chamber, without moving either of the members 30 or 32. The needle pitman brackets 20 are connected to the members 30 and 32 by means of the perforations 54 and the lugs 56 and 58, in a conventional manner. Thus it seems obvious that with the pitman brackets 20 rigidly positioned independently of the fluctuating side walls 14 and 16, that the needles will properly position the wire or twine for tying each time the tying mechanism is actuated.

An arm 62 is rigidly connected to the member 30 intermediate its ends on the leading edge opposite the lug 56 and inclined upwardly and forwardly in face to face alignment with the portion 46 of the member, terminating in an inwardly disposed centrally perforated lip portion 64 forming a right angularly shaped end in co-operation with the right angular end 34.

Similarly the member 32 has a forwardly and upwardly projecting arm 66 on the leading edge of the portion 46 opposite the lug 58 and terminating in a horizontal lip portion 68 forming a right angular end in co-operation with the right angular end 34 on the member 32. The arm 66 is horizontally slotted, as at 70, in co-operation with the slot 60 for accommodating the metering wheel 22.

The lip portions 64 and 68 are disposed under the frame of the tying mechanism 24 and are rigidly held in this position by bolts through the perforations. Thus it may be seen that the arms 62 and 66 provide a means for positively positioning and bracing the members 30 and 32 on the bale chamber relative to the tying mechanism and rigidly retains them so positioned, thus precluding any possible slippage or movement of the device longitudinally of the bale chamber.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A needle pitman guide for an automatic tying hay baler having tying needles supported by pitman pivot brackets and having a rectangular bale chamber within which hay is compressed, comprising: a pair of elongated plate metal side members vertically co-operatingly disposed, and each having transversely thickened right angularly shaped end portions adapted for receiving opposing surface corners of said bale chamber therebetween thereby disposing a central portion of each said side member in spaced-apart relation with the adjacent respective side wall of said bale chamber; an arm extending forwardly and upwardly from each said side member and terminating in a centrally perforated inwardly disposed flanged end co-planar with the uppermost right angular ends of said side members for connecting with the upper surface corners of said bale chamber and preventing longitudinal movement of said side members relative to said chamber, each of said side members perforated intermediate its ends, said needle pitman brackets pivotally connected to each respective said side member through the perforation therein, each of said side members having a flanged end projecting vertically above and below, respectively, in parallel relation from said bale chamber; and means rigidly connecting said flanged ends together, whereby the side walls of said bale chamber may fluctuate with respect to said side members when hay is compressed within the chamber.

2. A needle pitman guide for an automatic tying hay baler having tying needles supported by pitman pivot brackets and having a rectangular bale chamber within which hay is compressed, comprising: a pair of plate metal members vertically disposed in co-operating relation on opposing sides of said chamber, each said member having transversely thickened right angularly shaped end portions, said members adapted for receiving and holding opposing surface corners of said bale chamber therebetween, thereby disposing a central portion of each said member in spaced-apart relation with the adjacent respective side wall of said chamber, whereby the side walls of said chamber may fluctuate with relation to said members when hay is compressed therein; an arm extending forwardly and upwardly from the central portion of each said member in spaced-apart relation with the side walls of said bale chamber and terminating in a centrally perforated inwardly disposed flanged end co-planar with the uppermost right angular ends of said members for connecting with the upper surface corners of said bale chamber and preventing longitudinal movement of said members relative to said chamber, each of said members perforated intermediate its ends, said needle pitman brackets pivotally connected to the outwardly disposed surface of each respective said member through the perforation therein, each of said members having a flanged end projecting vertically above and below, respectively, in parallel relation from said chamber; and means rigidly connecting said respective pairs of flanged ends together.

References Cited in the file of this patent

UNITED STATES PATENTS

| | | |
|---|---|---|
| 510,821 | Sanders | Dec. 12, 1893 |
| 1,213,993 | Zachow | Jan. 30, 1917 |
| 2,699,107 | Strauss | Jan. 11, 1955 |